United States Patent
Shen et al.

(10) Patent No.: US 11,080,840 B2
(45) Date of Patent: Aug. 3, 2021

(54) AUTOMATIC OPTICAL INSPECTION DEVICE BASED ON CPU+GPU+FPGA ARCHITECTURE

(71) Applicant: Wuhan Jingce Electronic Group Co., Ltd., Wuhan (CN)

(72) Inventors: Yafei Shen, Wuhan (CN); Changdong Ou, Wuhan (CN); Biaohua Deng, Wuhan (CN); Zhou Wang, Wuhan (CN); Linhai Mei, Wuhan (CN); Wenzhong Dong, Wuhan (CN); Wentian Tang, Wuhan (CN); Bo Li, Wuhan (CN)

(73) Assignee: WUHAN JINGCE ELECTRONIC GROUP CO., LTD., Wuhan (CN)

( * ) Notice: Subject to any disclaimer, the term of this patent is extended or adjusted under 35 U.S.C. 154(b) by 0 days.

(21) Appl. No.: 16/862,610

(22) Filed: Apr. 30, 2020

(65) Prior Publication Data

US 2020/0258210 A1 Aug. 13, 2020

Related U.S. Application Data

(63) Continuation-in-part of application No. PCT/CN2018/102154, filed on Aug. 24, 2018.

(30) Foreign Application Priority Data

Oct. 31, 2017 (CN) .......................... 201711049462.2

(51) Int. Cl.
*G06T 7/00* (2017.01)
(52) U.S. Cl.
CPC .. *G06T 7/0002* (2013.01); *G06T 2207/30168* (2013.01)

(58) Field of Classification Search
CPC ......... G06T 7/0002; G06T 2207/30168; G06T 1/20; G06T 1/0014; G05B 19/042;
(Continued)

(56) References Cited

U.S. PATENT DOCUMENTS 10,429,321 B2 * 10/2019 Zamek ................. H04N 5/2256
2008/0317329 A1 * 12/2008 Shibuya ................ G06T 7/0004
382/149
(Continued)

FOREIGN PATENT DOCUMENTS

CN 105260339 A 1/2016
CN 105607312 A 5/2016
(Continued)

*Primary Examiner* — Sheela C Chawan
(74) *Attorney, Agent, or Firm* — Matthias Scholl P.C.; Matthias Scholl

(57) ABSTRACT

An automatic optical inspection device, including an image storage unit; an image computing unit; and an image acquisition unit. The image storage unit includes a first communication interface and a second communication interface. The image computing unit includes a first optical interface, a second optical interface, a third optical interface, and a fourth optical interface; the image acquisition unit includes a third communication interface and a camera interface. The image storage unit is configured to transmit configuration parameters and test commands to the image computing unit, receive a test result transmitted from the image computing unit via the first communication interface, and receive data from the image acquisition unit via the second communication interface. The image computing unit is configured to receive the configuration parameters and test commands from the image storage unit, and transmit the test result to the image storage unit via the first fiber interface.

11 Claims, 9 Drawing Sheets

(58) Field of Classification Search
CPC ........ G05B 2219/2656; G05B 19/0428; G01N 21/01; G01N 21/95

USPC ....... 382/244, 275, 131, 293, 274, 100, 254, 382/276, 128, 141, 142, 143, 144, 145, 382/147, 148, 149, 151, 152, 153, 169, 382/173, 190, 195, 214, 232, 234, 233, 382/236, 237, 238, 255, 266, 303, 304, 382/305, 312, 317, 321; 348/92, 87, 93, 348/36, 335, 143, E5.03, E7.087, E7.091, 348/E5.055, E5.091, 207.99; 707/E17.001, E17.009; 358/501

See application file for complete search history.

(56) References Cited

U.S. PATENT DOCUMENTS

| | | | |
|---|---|---|---|
| 2011/0069878 A1* | 3/2011 | Case | G01N 21/8806 |
| | | | 382/152 |
| 2011/0102575 A1* | 5/2011 | Case | H05K 13/0815 |
| | | | 348/87 |
| 2012/0133920 A1* | 5/2012 | Skunes | H04N 7/188 |
| | | | 356/23 |
| 2016/0292839 A1* | 10/2016 | Inoue | G01N 21/956 |
| 2018/0059033 A1* | 3/2018 | Zamek | H04N 5/2256 |

FOREIGN PATENT DOCUMENTS

| | | |
|---|---|---|
| CN | 107144992 A | 9/2017 |
| CN | 107273331 A | 10/2017 |
| CN | 107817216 A | 3/2018 |
| EP | 1621866 A1 | 2/2006 |
| KR | 20150111057 A | 10/2015 |

* cited by examiner

AUTOMATIC OPTICAL INSPECTION DEVICE BASED ON CPU+GPU+FPGA ARCHITECTURE

CROSS-REFERENCE TO RELATED APPLICATIONS

This application is a continuation-in-part of International Patent Application No. PCT/CN2018/102154 with an international filing date of Aug. 24, 2018, designating the United States, now pending, and further claims foreign priority benefits to Chinese Patent Application No. 201711049462.2 filed Oct. 31, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure belongs to the technical field of automatic optical inspection, and more particularly to an automatic optical inspection device based on CPU+GPU+FPGA architecture.

Conventionally, the automatic optical inspection (AOI) involves an optical system, mechanism control system, point screen control system, software control system, image processing system, etc. The AOI equipment is constructed based on an image acquisition card+PC. The acquisition cards and PCs have many varieties, which are costly and difficult to coordinate with one another, leading to poor system stability and inconvenient expansion. The system integration scheme is rough, complex, costly, instable, and inefficient, cannot achieve the expected effect, and has almost no expandability. It has become increasingly unpopular with panel manufacturers.

SUMMARY

The disclosure provides an automatic optical inspection device based on CPU+GPU+FPGA architecture. The automatic optical inspection device can simultaneously communicate with a plurality of cameras, and can comprehensively coordinate the generation of the screen lighting signal, the control of the light source and the image calculation and processing.

The disclosure provides an automatic optical inspection device, the device comprising an image storage unit; an image computing unit; and an image acquisition unit. The image storage unit comprises a first communication interface and a second communication interface; the image computing unit comprises a first optical interface, a second optical interface, a third optical interface, and a fourth optical interface; the image acquisition unit comprises a third communication interface and a camera interface;

the image storage unit is configured to transmit configuration parameters and test commands to the image computing unit, receive a test result transmitted from the image computing unit via the first communication interface, and receive data from the image acquisition unit via the second communication interface;

the image computing unit is configured to receive the configuration parameters and test commands from the image storage unit, and transmit the test result to the image storage unit via the first fiber interface, to receive the data from the image acquisition unit and transmit the configuration parameters and test commands to the image acquisition unit via the second fiber interface, to control the generation of a screen lighting signal via the third fiber interface, and to control an input/output (IO) light source via the fourth fiber interface; and the image acquisition unit is configured to output image data, the configuration parameters, and the test commands via the third communication interface, and to receive camera data and transmit the configuration parameters and the test commands to a camera via the camera interface.

The image storage unit comprises:

a master personal computer (PC), configured to perform parameter configuration, output the configuration parameters and test commands through human-machine interaction, and to receive and report a test result from a FPGA storage flatform;

the FPGA storage flatform, configured to receive, compress, and transmit the data from the image acquisition unit to a disk array, to receive and output the test result transmitted from the image computing unit, to output the configuration parameters received to the image acquisition unit, and to retrieve the image data in stored data; and the disk array for data storage.

The FPGA storage flatform comprises:

a data interaction module, configured to receive the configuration parameters from the master PC, and feedback the test result received from the image computing unit to the master PC;

an image data receiving/transmission module, configured to receive and output the image data from the image acquisition unit to a lossless compression module, to receive and transmit the configuration parameters to the image acquisition unit, and to receive the test result transmitted from the image computing unit;

a lossless compression module, configured to compress and store received data in the disk array; and a storage management module, configured to manage storage and read of the disk array.

The FPGA storage flatform further comprises:

a retrieval management module, configured to control the read of the disk assay; and a data exchange control module comprising a fourth communication interface, configured to communicate with an external server thereby achieving retrieval data exchange and data communication control.

The image computing unit comprises a FPGA computing platform and a PC; the first optical interface, second optical interface, third optical interface, and fourth optical interface are all disposed on the FPGA computing platform; the FPGA computing platform further comprises a fifth fiber interface connected to the PC and an extension interface for cascade extension of the FPGA computing platform.

The FPGA computing platform comprises a central controller, an image processing accelerator, a data gathering and transmission module, and a double data rate (DDR) memory;

the central controller is configured to transmit control commands to the PC and the image processing accelerator according to set instructions;

the PC is configured to read and calculate part of the image data from the DDR memory according to the control commands, and transmit a first calculation result to the data gathering and transmission module;

the image processing accelerator is configured to read and calculate another part of the image data from the DDR memory according to the control commands, and transmit a second calculation result to the data gathering and transmission module;

the data gathering and transmission module is configured to gather the first and second calculation results and transmit the test result to the image storage unit; and the DDR memory is configured to store the image data to be processed and the test result.

The FPGA computing platform further comprises a configuration parameter receiving module, a data receiving/parameter configuration module, a signal expansion module and an IO control module;

the configuration parameter receiving module is configured to receive and transmit the configuration parameter and the test commands to the central controller, and the central controller is configured to transmit the configuration parameter received to the data receiving/parameter configuration module, and assign the test commands received to the data receiving/parameter configuration module, the signal expansion module and the IO control module;

the data receiving/parameter configuration module is configured to receive and store the image data of the image acquisition unit in the DDR memory, transmit the configuration parameter and test commands received to the image acquisition unit;

the signal expansion module is configured to control the generation of the screen lighting signal according to the test commands; and the IO control module is configured to control the IO light source according to the test commands.

The image acquisition unit comprises:

a protocol parsing module, configured to receive and parse the camera data into effective image data, and store the effective image data in a DDR physical memory as raw image data;

the DDR physical memory, configured to store the raw image data and processed image data;

an image quality evaluation and preprocessing module, configured to read the raw image data from the DDR physical memory, preprocess the raw image data, transmit and store the raw image data preprocessed in the DDR physical memory as the processed image data;

a main control unit, configured to transmit control commands to the image quality evaluation and preprocessing module and a DDR data format conversion-and-read module according to set instructions;

a DDR data format conversion-and-read module, configured to read and transmit the raw image data and/or processed image data from the DDR physical memory to a data packet module; and the data packet module, configured to transmit the raw image data and/or processed image data received to the image storage unit and the image computing unit.

The image acquisition unit further comprises an autofocus exposure module and a camera configuration module;

the data packet module is configured to receive the configuration parameter and test commands to the main control unit;

the data packet module is configured to receive and parse the camera data into the effective image data, store the effective image data in the DDR physical memory, and transmit a camera parameter to the camera;

the image quality evaluation and preprocessing module is configured to evaluate the image quality of the camera data, and transmit an evaluation result to the main control unit;

the main control unit is further configured to transmit the configuration parameter, the test commands, and the evaluation result to the autofocus exposure module; and the autofocus exposure module is configured to set up the camera parameter according to the configuration parameter and the evaluation result, and transmit the configuration parameter and the evaluation result to the camera configuration module; and the camera configuration module is configured to transmit the configuration parameters and test commands to the protocol parsing module.

The protocol parsing module comprises a Camera link protocol parsing module, GigE Vision protocol parsing module and CLHS protocol parsing module; the camera interface comprises a plurality of Camera link interfaces, a plurality of GigE interfaces and a plurality of CLHS interfaces; the plurality of Camera link interfaces is connected to the Camera link protocol parsing module, and the plurality of GigE interfaces is connected to the GigE Vision protocol parsing module; and the plurality of CLHS interfaces is connected to the CLHS protocol parsing module.

Advantages of the automatic optical inspection device based on CPU+GPU+FPGA architecture according to embodiments of the disclosure are summarized as follows. The image storage unit, image computing unit and image acquisition unit cooperate with each other to realize the functions of image storage and retrieval, human-computer interaction, main control and display, processing result analysis and reporting, and to comprehensively control the generation of the screen lighting signal, signal expansion, light source, image acquisition, and camera parameter configuration. The tact time is short. The unit communicate with each other by optical fibers, and the data transmission speed is fast. The image computing unit can also expand the computing capacity by cascading; and the image computing unit uses CPU+GPU+FPGA architecture to fully expand the CPU+GPU unit and enhance the processing capacity of GPU; with FPGA as the central controller, the data to be processed is distributed to different GPU processing units, forming a distributed processing architecture. In addition, the FPGA itself functions as an image acceleration processor, gives full play to the parallel processing characteristics, and can coordinate the image division and the GPU+FPGA, effectively improving the image processing computing ability. The device can support a variety of camera interfaces, support automatic alignment, focusing, automatic exposure parameter setting, and has the functions of image quality evaluation and image pre-processing, etc. The whole system architecture has the advantages of simple structure, low cost, good stability, good coordination ability and strong computing processing ability.

Figure 1:
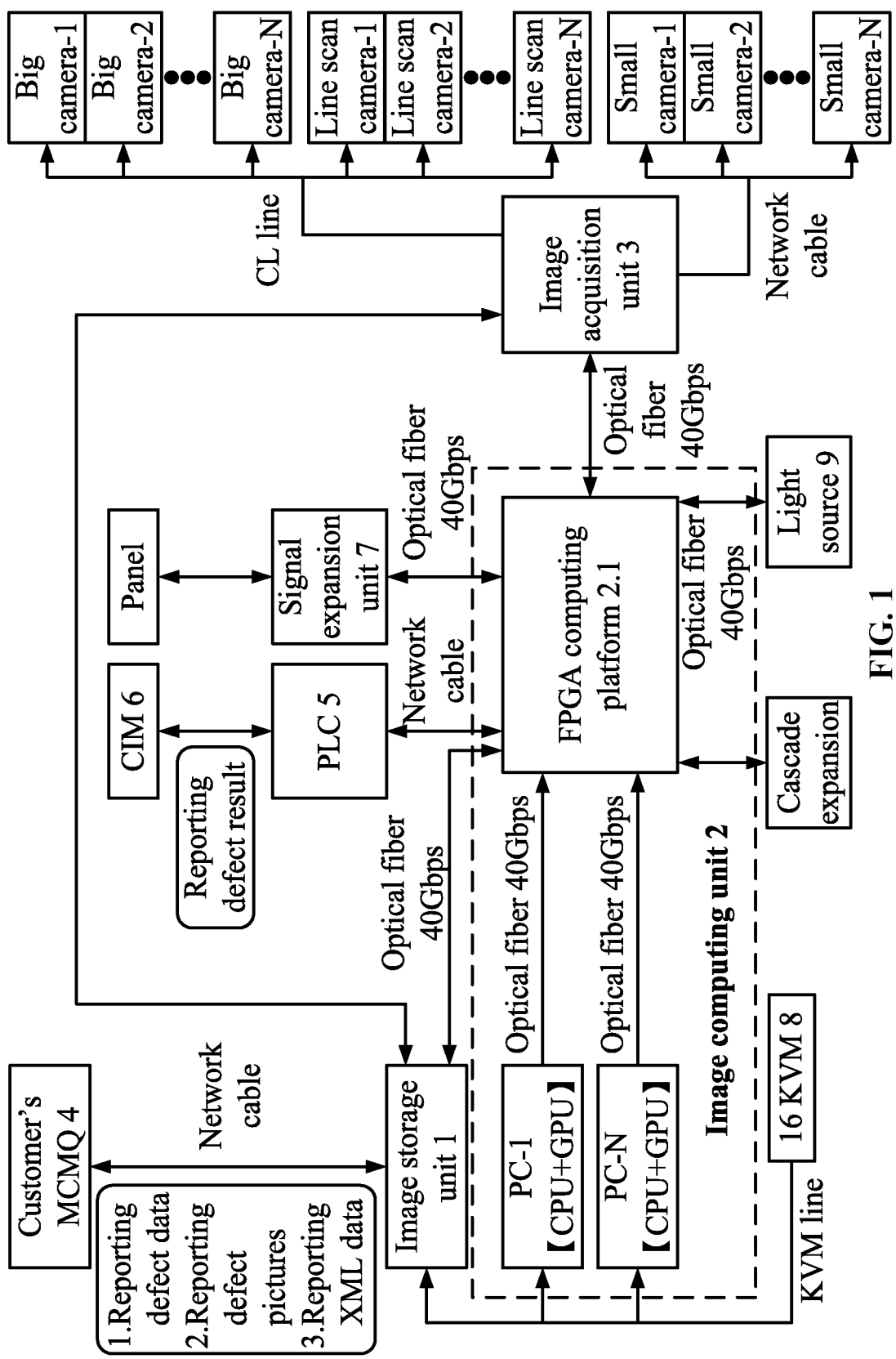
FIG. 1 is a functional block diagram of an automatic optical inspection device of the disclosure.

In the drawings, the following reference numbers are used: 1. Image storage unit; 1.1. Master PC; 1.2. FPGA storage flatform; 1.3. Disk array; 1.4. Data interaction module; 1.5. Image data receiving/transmission module; 1.6. Lossless compression module; 1.7. Storage management module; 1.8. Retrieval management module; 1.9. Data exchange control module; 2. Image computing unit; 2.1. FPGA computing platform; 2.2. PC; 2.3. Data receiving/parameter configuration module; 2.4. Write DDR data format conversion module; 2.5. Signal expansion module; 2.6. IO control module; 2.7. Central controller; 2.8. Image processing accelerator; 2.9. Configuration parameter receiving module; 2.10. Configuration register; 2.11. Data gathering and transmission module; 2.12. DDR data format conversion-and-read module; 2.13. Data transmission module; 2.14. AXI bus module; 2.15. DDR controller; 2.16. DDR memory; 3. Image acquisition unit; 3.1. Protocol parsing module; 3.2. Effective data extraction module; 3.3. Write DDR data format conversion module; 3.4. AXI bus; 3.5. DDR control module; 3.6. DDR physical memory; 3.7. Image quality evaluation and preprocessing module; 3.8. Main control unit; 3.9. Register configuration module; 3.10. Write DDR data format conversion module; 3.11. Data packet module; 3.12. Autofocus exposure module; 3.13. Camera configuration module; 4. Customer's MCMQ; 5. PLC; 6. CIM; 7. Signal expansion unit; 8. 16 KVM; 9. Light source.

DETAILED DESCRIPTION OF THE EMBODIMENTS

To further illustrate, embodiments detailing an automatic optical inspection device based on CPU+GPU+FPGA architecture are described below. It should be noted that the following embodiments are intended to describe and not to limit the disclosure.

As shown in FIG. 1, an automatic optical inspection device based on CPU+GPU+FPGA architecture comprises: an image storage unit 1; an image computing unit 2; and an image acquisition unit 3. The image storage unit 1 comprises a first communication interface and a second communication interface; the image computing unit 2 comprises a first optical interface, a second optical interface, a third optical interface, and a fourth optical interface; the image acquisition unit 3 comprises a third communication interface and a camera interface.

The image storage unit 1 is configured to perform parameter configuration through human-machine interaction, specifically, to transmit configuration parameters and test commands to the image computing unit, receive a test result transmitted from the image computing unit and report via the first communication interface, and receive data from the image acquisition unit via the second communication interface. The configuration parameters transmitted by the image storage unit comprises a Pattern list, screen parameters, camera parameters, detection parameters, etc.

The image computing unit 2 is configured to receive the configuration parameters and test commands from the image storage unit, and transmit the test result to the image storage unit via the first fiber interface, to receive the data from the image acquisition unit and transmit the configuration parameters and test commands to the image acquisition unit via the second fiber interface, to control the generation of a screen lighting signal (control the signal expansion unit 7 to light the module) via the third fiber interface, and to control an input/output (IO) light source (corresponding light source 9, backlight and sidelight) via the fourth fiber interface.

The image acquisition unit is configured to output image data, the configuration parameters, and the test commands via the third communication interface, and to receive camera data and transmit the configuration parameters and the test commands to a camera via the camera interface.

Figure 2:
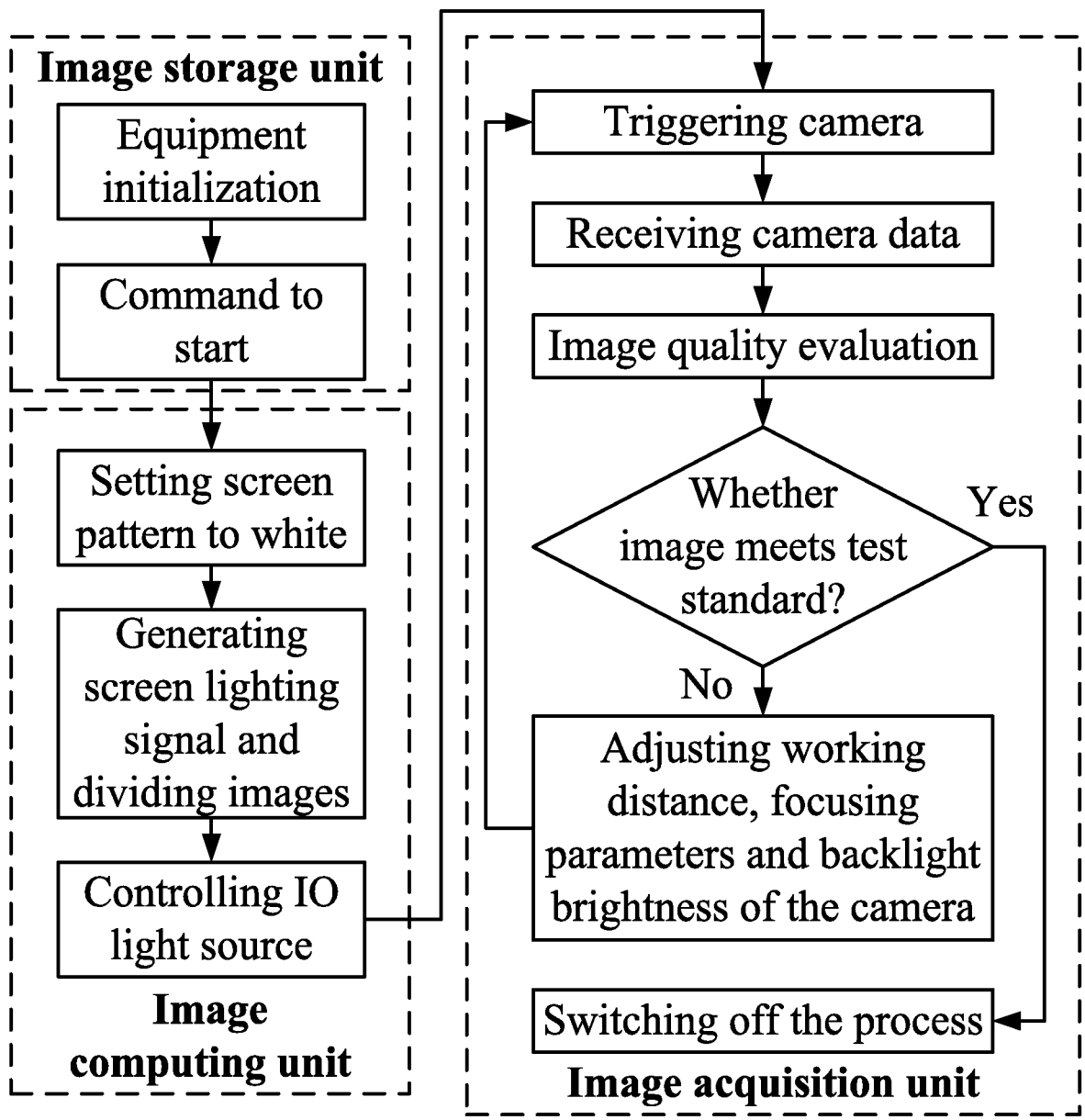
FIG. 2 is a flow chart of camera setting according to one embodiment of the disclosure.

In operation, the working distance, focusing parameters, exposure parameters, gain parameters, white balance parameters, backlight brightness of the camera are first adjusted, as shown in FIG. 2, which comprises:

1) equipment initialization, comprising camera and lens parameters, panel parameters, panel transmittance parameters, backlight parameters, etc.;

2) human-machine interface transmits the command to start;

3) set the screen pattern to white;

4) generation of screen lighting signal and the module is lighted;

5) trigger camera to take pictures;

6) evaluate the quality of the image, including brightness, clarity and sharpness, the size of the effective area, moire pattern, etc.;

7) if the image meets the test standard, the process will be switched off;

8) if the image does not meet the test standard, the working distance, focusing parameters and backlight brightness of the camera are adjusted according to the evaluation results;

9) repeat the operations in 5)-8), until satisfied image is acquired.

The automatic adjustment device and scheme takes only a few minutes to complete the adjustment of the camera; while the traditional adjustment method usually takes hours or even days; and the automatic adjustment device of the disclosure produces more consistent images.

Figure 3:
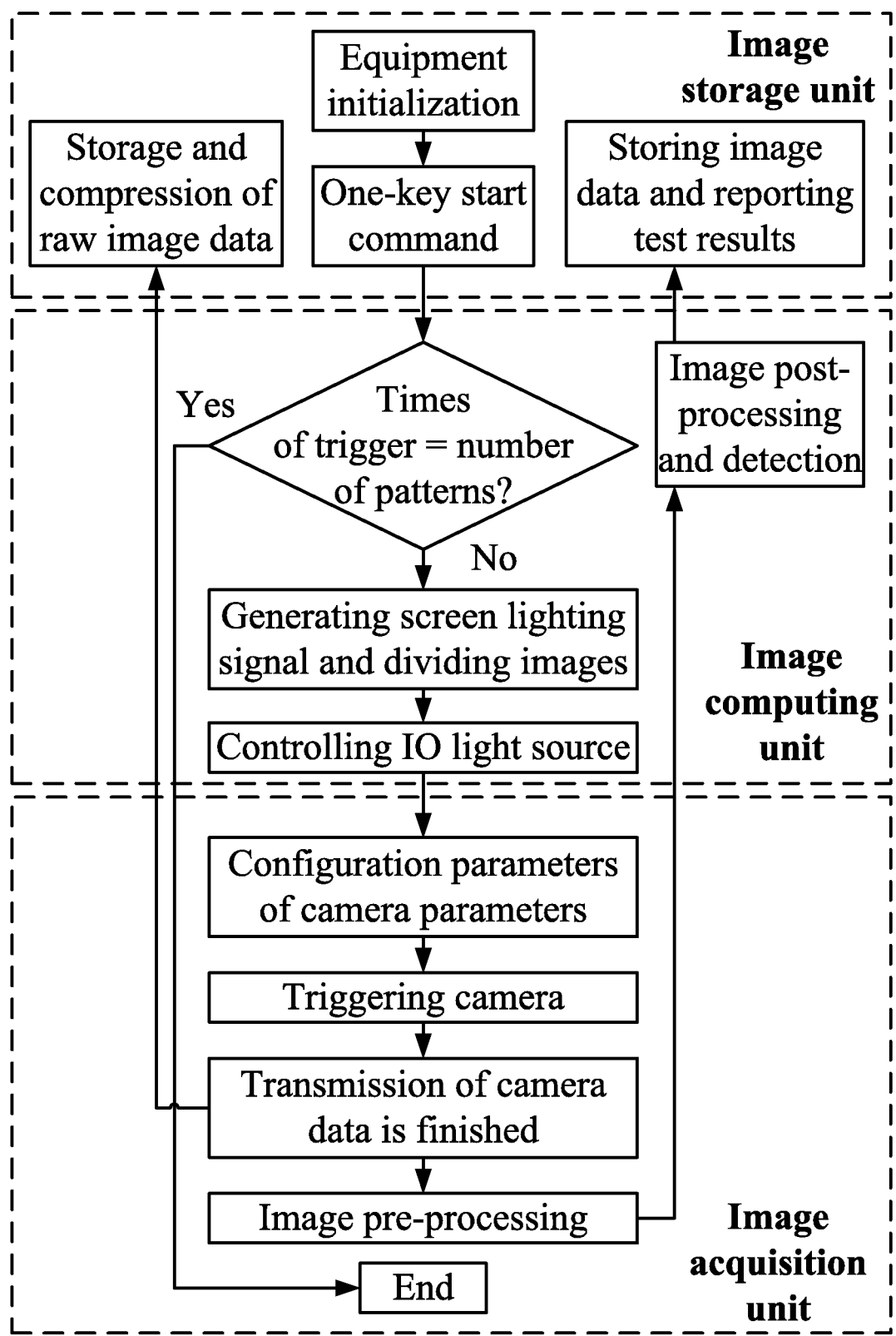
FIG. 3 is a flow chart of camera testing according to one embodiment of the disclosure.

Following the adjustment, the test procedure is implemented, as shown in FIG. 3:

1) equipment initialization;

2) the master control unit sets a one-key start command;

3) according to the set pattern sequence, generate the screen lighting signal and divide images;

4) according to the set light source sequence, different light source signals are lit through 10 control terminal;

5) set the exposure, gain and white balance parameters of the camera 6) trigger the camera;

7) receive the camera data;

8) image preprocessing, comprising brightness correction, dark angle correction, extraction and cutting of ROI region, background suppression, moire removal, gray stretch, etc.;

9) image post-processing, comprising defect detection, recognition and judgment;

10) reporting of the test results, comprising transmitting the data storage part to the customer's MCMQ system and transmitting the timely display part to the customer's CIM 6 system through PLC 5; and 11) storage and compression of raw image data.

Figure 4:
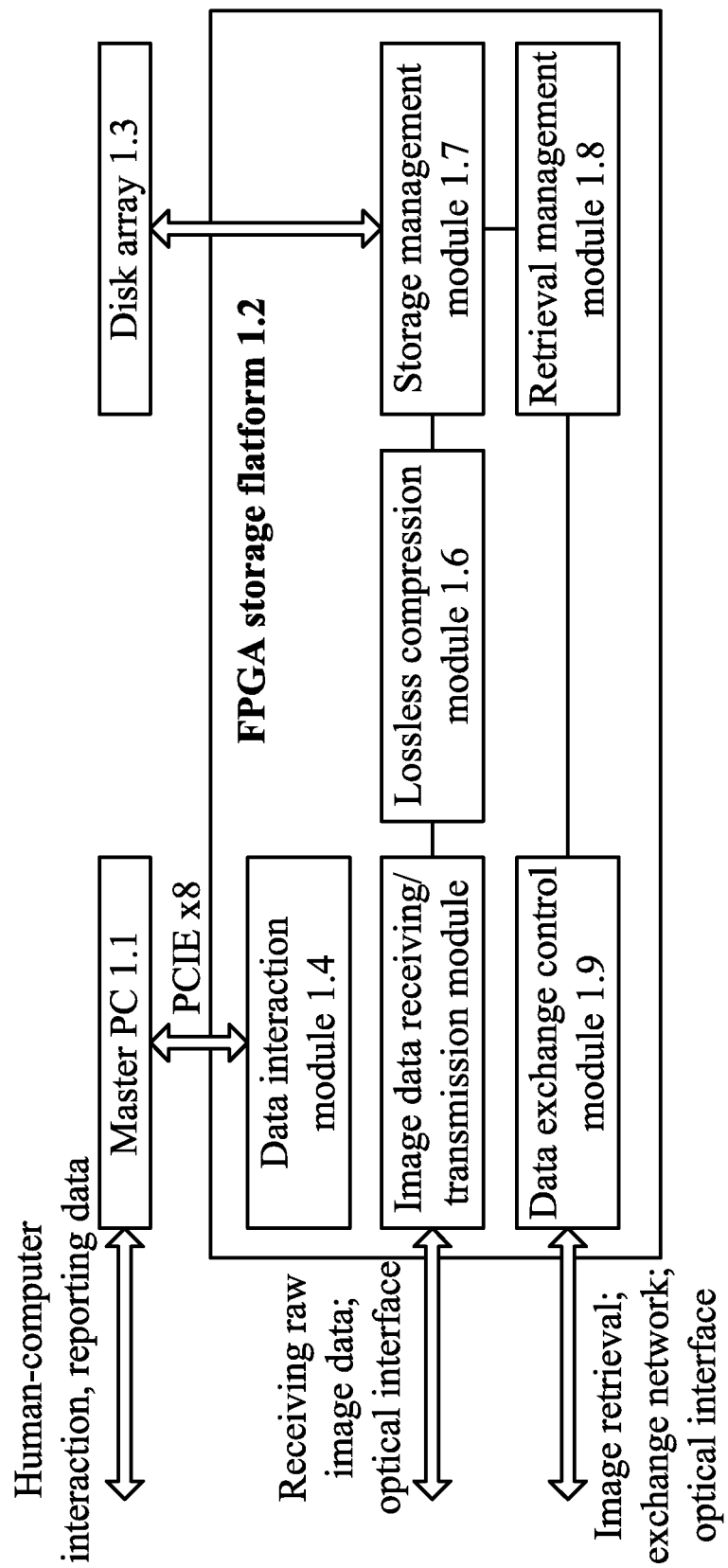
FIG. 4 is a functional block diagram of an image storage unit according to one embodiment of the disclosure.

As shown in FIG. 4, the image storage unit 1 comprises a master personal computer (PC) 1.1, a FPGA storage flatform (memory processing board based on FPGA) 1.2, and a disk array 1.3. The FPGA storage flatform 1.2 comprises a data interaction module 1.4, an image data receiving/transmission module 1.5, a lossless compression module 1.6, a storage management module 1.7, a retrieval management module 1.8, and a data exchange control module 1.9. On the one hand, the image storage unit is responsible for image storage and retrieval, and on the other hand, it has the functions of human-computer interaction, main control and display, processing and reporting the analysis result, etc. The data communication and interaction between the main control PC and the FPGA storage platform are carried out through the PCIE x8 mode. The first communication interface and the second communication interface are both disposed on the FPGA storage platform, that is, the data communication and interaction between the FPGA storage platform and the image computing unit and the image acquisition unit are carried out through the optical fiber, and the use of the optical fiber for network connection is convenient for image storage and retrieval. The storage unit is mainly used to store the raw image data and/or processed image data transmitted by the image acquisition unit. The processing result data of the image computing unit is not saved to a local server and will be uploaded directly to the customer's MCMQ 4 system. The images saved on the local area are used for subsequent data analysis and retrieval, which requires high storage space, and high storage and retrieval efficiency.

The functions of each module of the image storage unit are as follows:

the master personal computer (PC) 1.1 is configured to perform parameter configuration, output the configuration parameters and test commands through human-machine interaction, receive and report the test result from the FPGA storage flatform 1.2, connect to the customer's MCMQ 4 system, and report the defect data, defect pictures and XML data of the test result;

the disk array 1.3 is used for data storage;

the data interaction module 1.4 is configured to receive the configuration parameters from the master PC, and feedback the test result received from the image computing unit to the master PC;

the image data receiving/transmission module 1.5 is configured to receive and output the image data from the image acquisition unit to a lossless compression module, to receive and transmit the configuration parameters to the image acquisition unit, and to receive the test result transmitted from the image computing unit;

the lossless compression module 1.6 is configured to compress and store received data in the disk array; the lossless compression of data can greatly improve the utilization of the storage space and alleviate the pressure on the retrieval bandwidth;

the storage management module 1.7 is configured to manage storage and read of the disk array;

the retrieval management module 1.8 is configured to control the read of the disk assay; and the data exchange control module 1.9 comprises a fourth communication interface and is configured to communicate with an external server thereby achieving retrieval data exchange and data communication control. During retrieval, the image data needed should be read out from the local area and transmitted to the retrieval server through the optical fiber exchange network. The retrieval server can use the image after lossless decompression. The image can be used only after the lossless decompression by the retrieval server.

Figure 5:
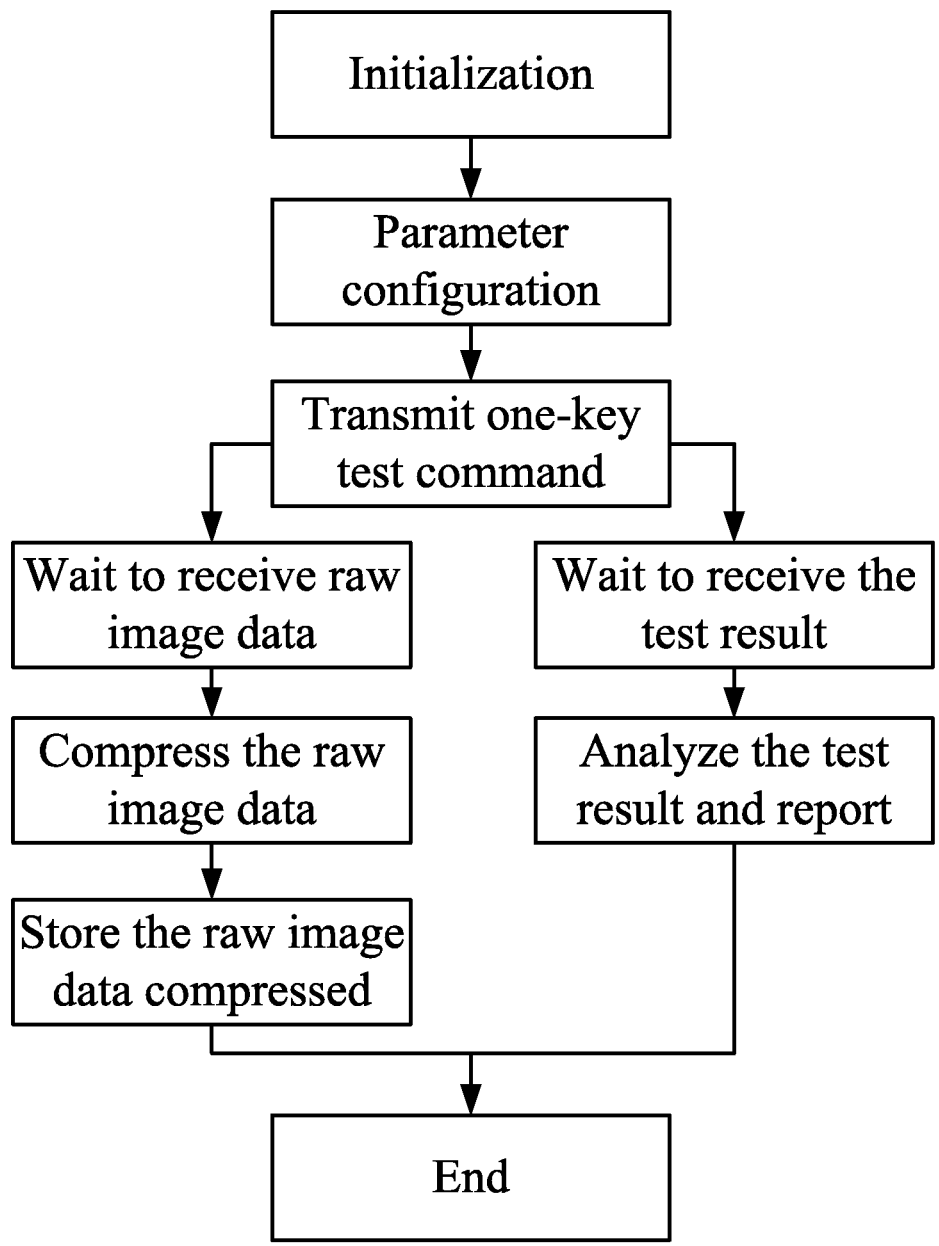
FIG. 5 is a flow chart of operation of an image storage unit according to one embodiment of the disclosure.

As shown in FIG. 5, the data processing procedure of the image storage unit is as follows:
1) initialization;
2) parameter configuration;
3) transmit one-key test command;
4) wait to receive raw image data;
5) compress the raw image data;
6) store the raw image data compressed;
7) wait to receive the test result;
8) analyze the test result and report;
9) end.

Figure 6:
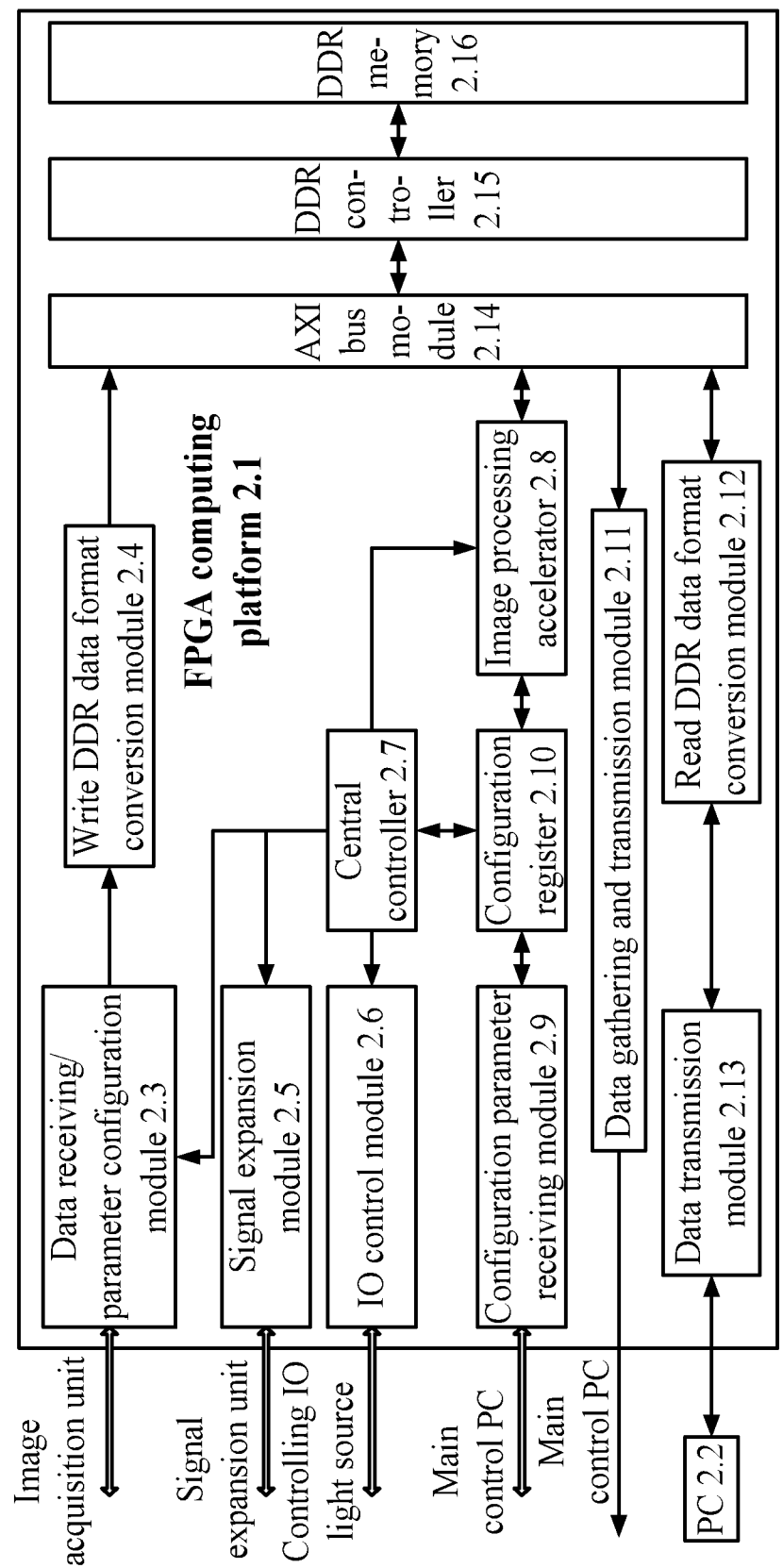
FIG. 6 is a functional block diagram of an image computing unit according to one embodiment of the disclosure.

As shown in FIG. 6, the image computing unit 2 comprises a FPGA computing platform 2.1 (calculation processing board based on FPGA) and a PC 2.2; the first optical interface, second optical interface, third optical interface, and fourth optical interface are all disposed on the FPGA computing platform; the FPGA computing platform further comprises a fifth fiber interface connected to the PC and an extension interface for cascade extension of the FPGA computing platform. The FPGA computing platform 2.1 comprises a data receiving/parameter configuration module 2.3, a write DDR data format conversion module 2.4, a signal expansion module 2.5, an IO control module 2.6, a central controller 2.7, an image processing accelerator 2.8, a configuration parameter receiving module 2.9, a configuration register 2.10, a data gathering and transmission module 2.11, a DDR data format conversion-and-read module 2.12, a data transmission module 2.13, an AXI bus module 2.14, a DDR controller 2.15, and a DDR memory 2.16. The PC comprises CPU and GPU. In addition to accelerating the image computing by the image computing unit, the FPGA computing platform also has the functions of generation of the screen lighting signal, signal expansion, and integrated control of the light sources. A FPGA computing platform comprises 12 QSFP+fiber interfaces, and up to 6 PCs. The plurality of PCs can be switched and controlled through 16 KVM 8 equipment. The FPGA computing platform, the PC, the image storage unit, the image acquisition unit, the signal expansion unit 7, and the IO control module all communicate with each other through optical fibers. The FPGA computing platform supports the cascade expansion through the fiber interface to expand the computing capacity. The FPGA computing platform and the CPU and GPU of the PC form CPU+GPU+FPGA architecture, and perform, according to the image data flow mode, Pipeline structure processing, FPGA image pre-processing, CPU+GPU image post-processing, thereby fully improving the computing speed.

The functions of each module of the image computing unit are as follows:

the PC 2.2 is configured to read and calculate part of the image data from the DDR memory according to the control commands, and transmit a first calculation result to the data gathering and transmission module;

the data receiving/parameter configuration module 2.3 is configured to receive and store the image data of the image acquisition unit in the DDR memory, transmit the configuration parameter and test commands received to the image acquisition unit;

the write DDR data format conversion module 2.4 is configured to convert the format of the received data;

the signal expansion module 2.5 is configured to generate and control the screen lighting signal according to the test commands;

the IO control module 2.6 is configured to control the IO light source according to the test commands;

the central controller 2.7 is configured to transmit the configuration parameter received to the data receiving/parameter configuration module, and assign the test commands received to the data receiving/parameter configuration module, the signal expansion module and the IO control module;

the image processing accelerator 2.8 is configured to read and calculate another part of the image data from the DDR memory according to the control commands, and transmit a second calculation result to the data gathering and transmission module;

the configuration parameter receiving module 2.9 is configured to receive and transmit the configuration parameter and the test commands to the central controller;

the configuration register 2.10 is configured to configure a register;

the data gathering and transmission module 2.11 is configured to gather the first and second calculation results and transmit the test result to the image storage unit;

the DDR data format conversion-and-read module 2.12 is configured to convert the format of the received data;

the data transmission module 2.13 is configured to transmit data to be calculated to the PC;

the AXI bus module 2.14 is configured to read and write the image data to the DDR memory under the control of the central controller;

the DDR controller 2.15 is configured to control the read and write of the image data and test result;

the DDR memory 2.16 is configured to store the image data to be processed and the test result.

Figure 7:
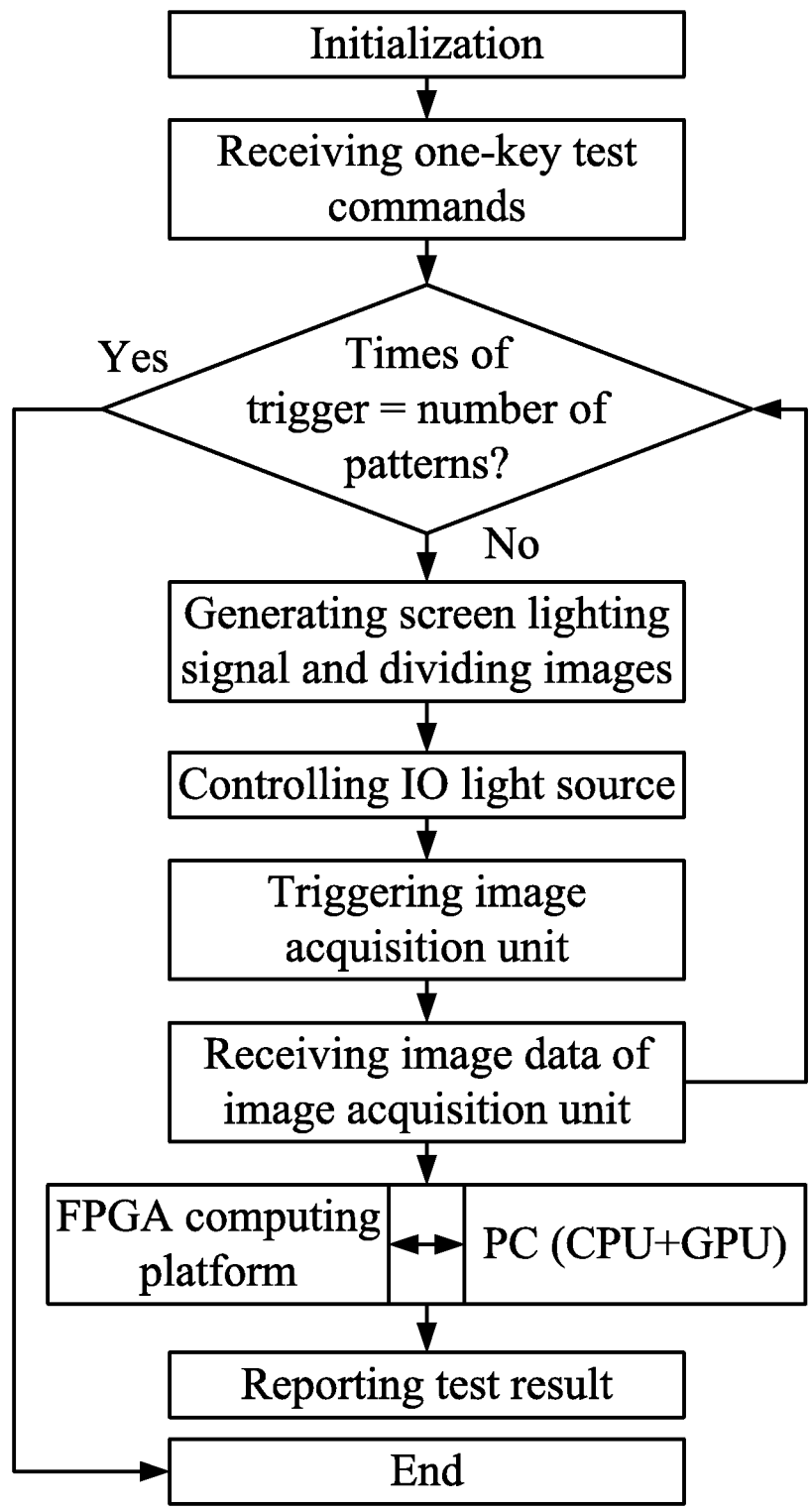
FIG. 7 is a flow chart of operation of an image computing unit according to one embodiment of the disclosure.

As shown in FIG. 7, the data processing procedure of the image computing unit is as follows:

1) initialization;
2) receive one-key test commands;
3) determine whether the number of patterns processed is equal to the set total number of patterns. If so, determine the one-key processing test is completed and end the process;
4) if the one-key test is not completed, light up the module according to the pattern list;
5) light the light source according to the pattern list;
6) trigger camera to capture images;
7) receive the image data of the image acquisition unit, and return to determine the number of times of trigger;
8) process the received data, determine whether the tested module has defects and judge the defect level; and
9) report the test result.

Figure 8:
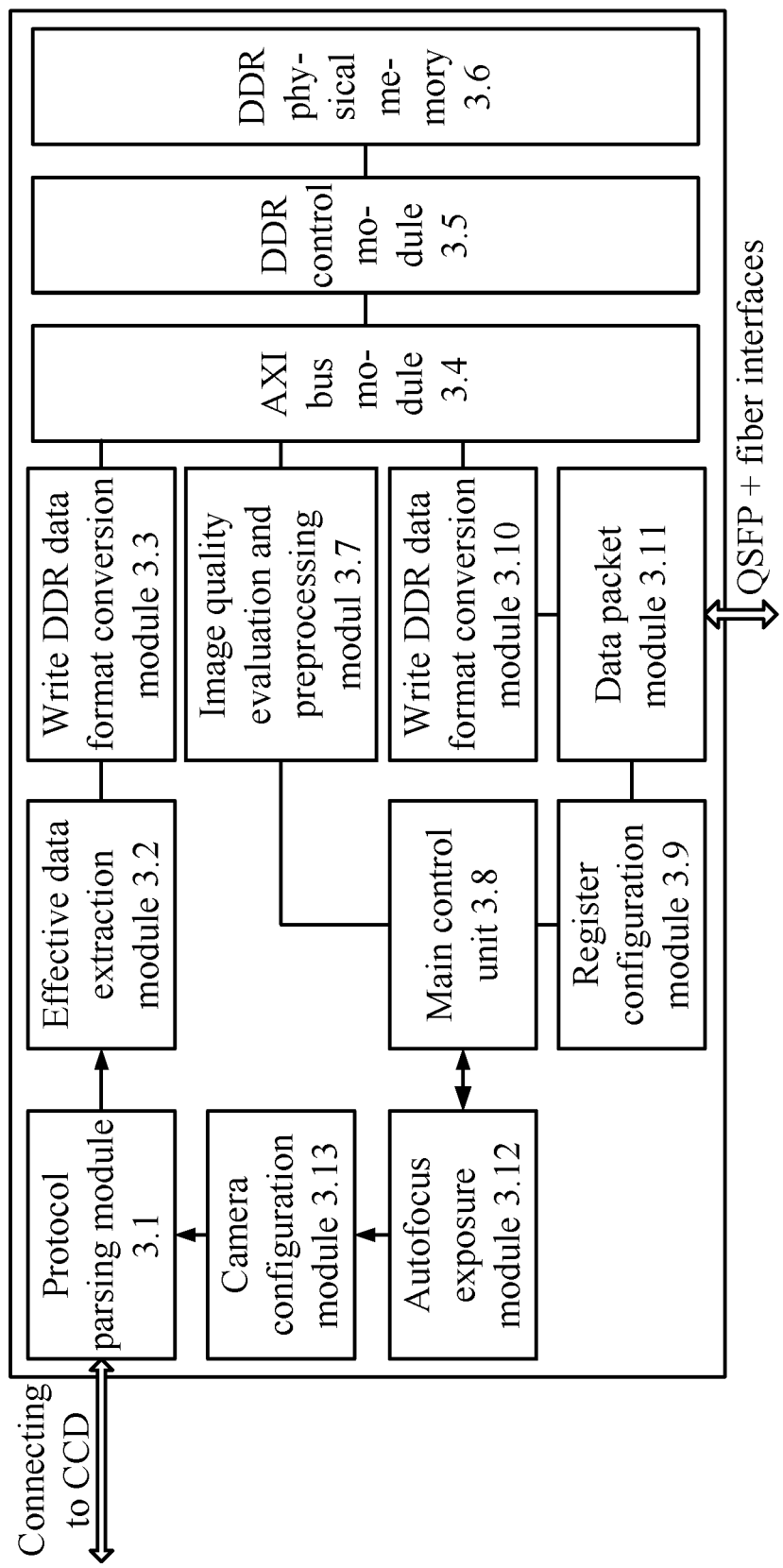
FIG. 8 is a functional block diagram of an image acquisition unit according to one embodiment of the disclosure.

As shown in FIG. 8, the image acquisition unit 1 comprises a protocol parsing module 3.1, an effective data extraction module 3.2, a write DDR data format conversion module 3.3, an AXI bus 3.4, a DDR control module 3.5, a DDR physical memory 3.6, an image quality evaluation and preprocessing module 3.7, a main control unit 3.8, a register configuration module 3.9, a write DDR data format conversion module 3.10, a data packet module 3.11, an autofocus exposure module 3.12 and a camera configuration module 3.13. The image acquisition unit uses Xilinx SOC chip as the main control unit, is compatible with 8 Cameralink interfaces, 8 GigE interfaces and 4 CLHS interfaces, and communicates with the FPGA computing platform through the fiber interface and perform data communication according to self-customized protocol.

The image acquisition unit is compatible with multiple camera interfaces and a variety of cameras, and can automatically align, focus, set exposure parameters, assess the image quality, produce better image consistency, automatically adjust the exposure time (according to backlight brightness, panel transmittance, and lens distortion) and the gain, correct the brightness and dark angle, thus improving the image quality and consistency; the image acquisition unit can also perform pre-processing of the image, comprising brightness correction, dark angle correction, extraction and cutting of ROI region, background suppression, moire removal, gray stretch, etc.

The functions of each module of the image acquisition unit 3 are as follows:

The protocol parsing module 3.1 is configured to receive and parse the camera data into effective image data and transmit the camera configuration parameter to the camera; the camera data is processed by the effective data extraction module and the write DDA data format conversion module, and transmitted to the DDR physical memory as raw image data. The parsed image data comprises 24-bit image data and frame control signal VS/HS/DE; it is used to transmit the camera configuration parameters to the camera.

The protocol parsing module comprises a Camera link protocol parsing module, GigE Vision protocol parsing module and CLHS protocol parsing module; the camera interface comprises a plurality of Camera link interfaces, a plurality of GigE interfaces and a plurality of CLHS interfaces; the plurality of Camera link interfaces is connected to the Camera link protocol parsing module, and the plurality of GigE interfaces is connected to the GigE Vision protocol parsing module; and the plurality of CLHS interfaces is connected to the CLHS protocol parsing module.

The effective data extraction module 3.2 is configured to extract the effective image data according to the configuration parameters of the main control unit; the obtained data from the protocol parsing module is 24-bit data.

The write DDR data format conversion module 3.3 is configured to store the received data into the physical memory, and to convert the format of the effective image data of the camera into AXI4 write data of the memory.

The AXI bus 3.4 is configured to read and write the image data to the DDR physical memory under the control of the main control unit.

The DDR control module 3.5 is configured to control the read and write of the image data.

The DDR physical memory 3.6 is configured to store the raw image data and the processed image data.

The image quality evaluation and preprocessing module 3.7 is configured to read the raw image data from the DDR physical memory according to the CPU control command, preprocess the raw image data, transmit the preprocessed data to the DDR physical memory as the processed image data, evaluate the image quality of the camera data, and transmit an evaluation result to the main control unit. The image preprocessing comprises brightness correction, dark angle correction, extraction and cutting of ROI region, background suppression, moire removal, gray stretch, etc.

The main control unit 3.8 is configured to transmit the control commands to the image quality evaluation and preprocessing module and the DDR data format conversion-and-read module, and transmit the configuration parameter, the test commands, and the evaluation result to the autofocus exposure module.

The register configuration module 3.9 is configured to perform the configuration of corresponding register.

The write DDR data format conversion module 3.10 is configured to read and transmit the raw image data and/or processed image data from the DDR physical memory to the data packet module.

The data packet module 3.11 is configured to transmit the raw image data and/or processed image data received to the image storage unit and the image computing unit, and receive and transmit the configuration parameters and the test commands to the main control unit.

The autofocus exposure module 3.12 is configured to set up the camera parameter according to the configuration parameter and the evaluation result, and transmit the configuration parameter and the evaluation result to the camera configuration module.

The camera configuration module 3.13 is configured to transmit the configuration parameters and test commands to the protocol parsing module.

Figure 9:
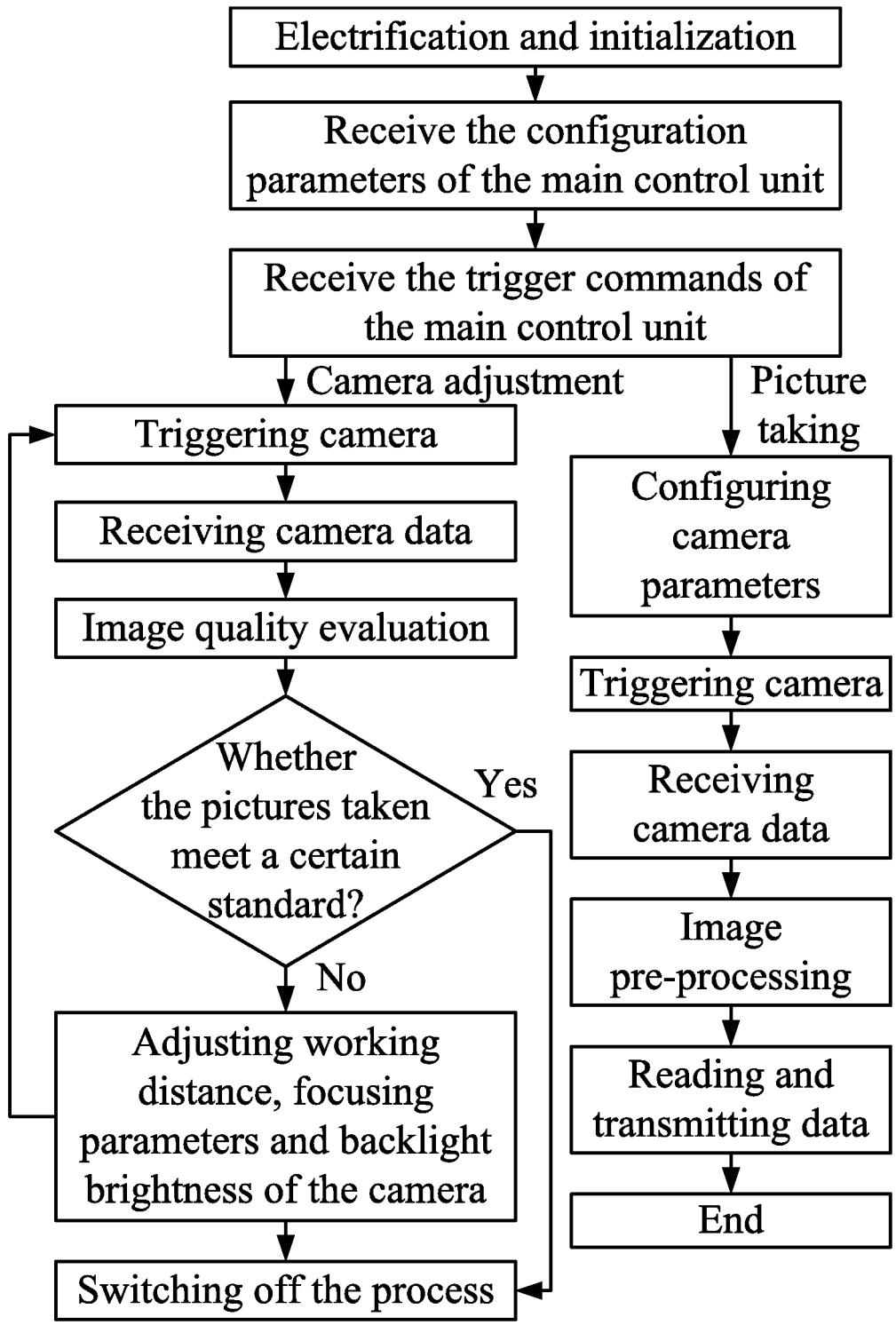
FIG. 9 is a flow chart of operation of an image acquisition unit according to one embodiment of the disclosure.

As shown in FIG. 9, the data processing procedure of the image computing unit is as follows:

1) electrification and initialization: initialization of equipment, camera initialization, focusing of camera, etc.;
2) receive the configuration parameters of the main control unit, the parameters including camera parameters, panel size, resolution, transmittance information, backlight brightness, working mode, etc.;
3) receive the trigger commands of the main control unit, the commands comprising a command for adjusting the machine and a command for taking pictures; when the command for adjusting the machine is received, the mode for adjusting the machine works, and when the command for taking pictures is received, the mode for taking pictures works;
4) camera adjustment, comprising adjustment of the working distance, focusing parameters, exposure parameters, gain parameters, white balance parameters, backlight brightness of camera, etc.;
   a) trigger the camera to take pictures;
   b) evaluate the pictures to determine whether the pictures taken meet a certain standard;
   c) if so, record the current adjustment parameters and exit;
   d) if not so, adjust, according to the configuration parameters, the working distance, focal length, exposure time, gain, and white balance of the camera; and
   repeat the above operations until the pictures taken meet the standard;
5) picture taking:
   a) configure camera parameters, including exposure time, gain and white balance;
   b) trigger the camera;
   3) the camera receives the data;
   4) image preprocessing, comprising brightness correction, dark angle correction, extraction and cutting of ROI region, background suppression, moire removal, gray stretch, etc.; and
   5) read out the data from the DDR memory and transmit the data to the front end through the optical fiber for next processing.

The automatic optical inspection device of the disclosure can simultaneously manage up to 20 cameras for data acquisition and processing, greatly optimizing the system complexity of the high-resolution and large-size panel, the tact time of the acquisition of the compressed image, and improving the system stability; in addition, the camera has the comprehensive properties of automatic alignment, focusing and image quality detection, automatically realizing the image quality management, which is very convenient for the on-site adjustment of the camera; the independently developed image quality evaluation system can quickly realize the adjustment of the camera, with good image consistency; the FPGA image storage management system can improve the image storage efficiency, facilitate image retrieval, and provide necessary source images for machine learning and intelligent detection.

The star network parallel acceleration computing system of CPU+GPU+FPGA gives full play to the parallel processing characteristics of GPU and FPGA and improves the overall computing capacity of the system; according to the direction of the data flow, the image preprocessing is accelerated at the FPGA end by using the pipeline structure, and then the image post-processing is realized at the CPU and GPU end; with the acceleration system, the image computing processing capacity is improved by more than 50%.

It will be obvious to those skilled in the art that changes and modifications may be made, and therefore, the aim in the appended claims is to cover all such changes and modifications.

What is claimed is:

1. A device, comprising:
   1) an image storage unit;
   2) an image computing unit; and
   3) an image acquisition unit;
wherein:
   the image storage unit comprises a first communication interface and a second communication interface;
   the image computing unit comprises a first optical interface, a second optical interface, a third optical interface, and a fourth optical interface;
   the image acquisition unit comprises a third communication interface and a camera interface;
   the image storage unit is configured to transmit configuration parameters and test commands to the image computing unit, receive a test result transmitted from the image computing unit via the first communication interface, and receive data from the image acquisition unit via the second communication interface;
   the image computing unit is configured to receive the configuration parameters and test commands from the image storage unit, and transmit the test result to the image storage unit via the first fiber interface, to receive the data from the image acquisition unit and transmit the configuration parameters and test commands to the image acquisition unit via the second fiber interface, to control the generation of a screen lighting signal via the third fiber interface, and to control an input/output (IO) light source via the fourth fiber interface;
   the image computing unit comprises a field-programmable gate array (FPGA) computing platform and a personal computer (PC); the image computing unit communicates and exchanges data with the PC, the image storage unit, and the image acquisition unit via fibers; the FPGA computing platform is a FPGA-based calculation processing board configured to accelerate image preprocessing; the PC comprises a central processing unit (CPU) and a graphics processing unit (GPU) for image postprocessing; and
   the image acquisition unit is configured to output image data, the configuration parameters, and the test commands via the third communication interface, and to receive camera data and transmit the configuration parameters and the test commands to a camera via the camera interface.

2. The device of claim 1, wherein the image storage unit comprises:
   a master personal computer (PC), configured to perform parameter configuration, output the configuration parameters and test commands through human-machine interaction, and to receive and report a test result from a FPGA storage flatform;
   the FPGA storage flatform, configured to receive, compress, and transmit the data from the image acquisition unit to a disk array, to receive and output the test result transmitted from the image computing unit, to output the configuration parameters received to the image acquisition unit, and to retrieve the image data in stored data; and the disk array for data storage.

3. The device of claim 2, wherein the FPGA storage flatform comprises:
a data interaction module, configured to receive the configuration parameters from the master PC, and feedback the test result received from the image computing unit to the master PC;
an image data receiving/transmission module, configured to receive and output the image data from the image acquisition unit to a lossless compression module, to receive and transmit the configuration parameters to the image acquisition unit, and to receive the test result transmitted from the image computing unit;
a lossless compression module, configured to compress and store received data in the disk array; and
a storage management module, configured to manage storage and read of the disk array.

4. The device of claim 2, wherein the FPGA storage flatform further comprises:
a retrieval management module, configured to control the read of the disk assay; and
a data exchange control module comprising a fourth communication interface, configured to communicate with an external server thereby achieving retrieval data exchange and data communication control.

5. The device of claim 1, wherein the first optical interface, second optical interface, third optical interface, and fourth optical interface are all disposed on the FPGA computing platform; the FPGA computing platform further comprises a fifth fiber interface connected to the PC and an extension interface for cascade extension of the FPGA computing platform.

6. The device of claim 5, wherein
the FPGA computing platform comprises a central controller, an image processing accelerator, a data gathering and transmission module, and a double data rate (DDR) memory;
the central controller is configured to transmit control commands to the PC and the image processing accelerator according to set instructions; and the PC is configured to read and calculate part of the image data from the DDR memory according to the control commands, and transmit a first calculation result to the data gathering and transmission module;
the image processing accelerator is configured to read and calculate another part of the image data from the DDR memory according to the control commands, and transmit a second calculation result to the data gathering and transmission module;
the data gathering and transmission module is configured to gather the first and second calculation results and transmit the test result to the image storage unit; and
the DDR memory is configured to store the image data to be processed and the test result.

7. The device of claim 6, wherein
the FPGA computing platform further comprises a configuration parameter receiving module, a data receiving/parameter configuration module, a signal expansion module and an TO control module;
the configuration parameter receiving module is configured to receive and transmit the configuration parameter and the test commands to the central controller, and the central controller is configured to transmit the configuration parameter received to the data receiving/parameter configuration module, and assign the test commands received to the data receiving/parameter configuration module, the signal expansion module and the IO control module;
the data receiving/parameter configuration module is configured to receive and store the image data of the image acquisition unit in the DDR memory, transmit the configuration parameter and test commands received to the image acquisition unit;
the signal expansion module is configured to control the generation of the screen lighting signal according to the test commands; and
the IO control module is configured to control the IO light source according to the test commands.

8. The device of claim 1, wherein the image acquisition unit comprises:
a protocol parsing module, configured to receive and parse the camera data into effective image data, and store the effective image data in a DDR physical memory as raw image data;
the DDR physical memory, configured to store the raw image data and processed image data;
an image quality evaluation and preprocessing module, configured to read the raw image data from the DDR physical memory, preprocess the raw image data, transmit and store the raw image data preprocessed in the DDR physical memory as the processed image data;
a main control unit, configured to transmit control commands to the image quality evaluation and preprocessing module and a DDR data format conversion-and-read module according to set instructions;
a DDR data format conversion-and-read module, configured to read and transmit the raw image data and/or processed image data from the DDR physical memory to a data packet module; and
the data packet module, configured to transmit the raw image data and/or processed image data received to the image storage unit and the image computing unit.

9. The device of claim 8, wherein
the image acquisition unit further comprises an autofocus exposure module and a camera configuration module;
the data packet module is configured to receive the configuration parameter and test commands to the main control unit;
the protocol parsing module is configured to receive and parse the camera data into the effective image data, store the effective image data in the DDR physical memory, and transmit a camera parameter to the camera;
the image quality evaluation and preprocessing module is configured to evaluate the image quality of the camera data, and transmit an evaluation result to the main control unit;
the main control unit is further configured to transmit the configuration parameter, the test commands, and the evaluation result to the autofocus exposure module;
the autofocus exposure module is configured to set up the camera parameter according to the configuration parameter and the evaluation result, and transmit the configuration parameter and the evaluation result to the camera configuration module; and
the camera configuration module is configured to transmit the configuration parameters and test commands to the protocol parsing module.

10. The device of claim 9, wherein the protocol parsing module comprises a Camera link protocol parsing module, GigE Vision protocol parsing module and CLHS protocol parsing module; the camera interface comprises a plurality of Camera link interfaces, a plurality of GigE interfaces and a plurality of CLHS interfaces; the plurality of Camera link interfaces is connected to the Camera link protocol parsing module, and the plurality of GigE interfaces is connected to the GigE Vision protocol parsing module; and the plurality of CLHS interfaces is connected to the CLHS protocol parsing module.

11. The device of claim 8, wherein the protocol parsing module comprises a Camera link protocol parsing module, GigE Vision protocol parsing module and CLHS protocol parsing module; the camera interface comprises a plurality of Camera link interfaces, a plurality of GigE interfaces and a plurality of CLHS interfaces; the plurality of Camera link interfaces is connected to the Camera link protocol parsing module, and the plurality of GigE interfaces is connected to the GigE Vision protocol parsing module; and the plurality of CLHS interfaces is connected to the CLHS protocol parsing module.

* * * * *